United States Patent

Xia et al.

Patent Number: 5,852,567
Date of Patent: Dec. 22, 1998

[54] ITERATIVE TIME-FREQUENCY DOMAIN TRANSFORM METHOD FOR FILTERING TIME-VARYING, NONSTATIONARY WIDE BAND SIGNALS IN NOISE

[75] Inventors: Xiang-Gen Xia, Westlake Village, Calif.; Shie Qian, Austin, Tex.

[73] Assignees: Hughes Electronics Corporation, El Segundo, Calif.; National Instruments Corporation, Austin, Tex.

[21] Appl. No.: 695,321

[22] Filed: Jul. 31, 1996

[51] Int. Cl.[6] .......................... G06F 15/31; G01R 23/16
[52] U.S. Cl. ........................ 364/725.01; 702/76
[58] Field of Search ............ 364/724.011, 724.19, 364/725.01, 485, 484, 826; 342/192, 194, 195; 73/602; 702/76

[56] References Cited

U.S. PATENT DOCUMENTS

| | | | |
|---|---|---|---|
| 4,837,578 | 6/1989 | Gammell | 342/194 |
| 4,894,795 | 1/1990 | Whitehouse et al. | 364/807 |
| 5,046,504 | 9/1991 | Albert et al. | 128/696 |
| 5,291,560 | 3/1994 | Daugman | 382/2 |
| 5,353,233 | 10/1994 | Oian et al. | 364/485 |

OTHER PUBLICATIONS

Qian, Shie and Dapang Chen, "Discrete Gabor Transform," IEEE Transactions on Signal Processing, vol. 41, No. 7, Jul. 1993, pp. 2429–2438.

Qian, Shie and Dapang Chen, "Optimal Biorthogonal Analysis Window Function for Discrete Gabor Transform," IEEE Transactions on Special Processng, vol. 42, No. 3, Mar. 1994, pp. 694–697.

Qian et al., "Discrete Gabor Transform", IEEE Transactions on Signal Processing, vol. 41, No. 7, Jul. 1993, pp. 2429–2438.

Wexler et al., "Discrete Gabor Expansions", Elsevier Science Publishers B.V., vol. 21, No. 3, Nov. 1990, pp. 207–220.

Primary Examiner—Ayaz R. Sheikh
Assistant Examiner—Douglas S. Lee
Attorney, Agent, or Firm—V. D. Duraiswamy; W. K. Denson-Low

[57] ABSTRACT

An iterative time frequency algorithm filters noisy wide band/nonstationary signals by projecting the noisy signal into the TF domain, masking the TF response, computing the inverse TF transform to extract a filtered signal, and repeating these steps until the projection lies within the mask. As a result, the TF domain properties of the extracted signal are substantially equal to the desired TF domain properties. Furthermore, the iterative approach is computationally simple because it avoids inverting matrices. The TF transform and its inverse must be selected such that the iterative algorithm is guaranteed to converge. Candidate transform pairs can be tested on known data, and if the TF transforms converge to the desired TF properties, the candidate pair can be selected. Alternately, the candidate pairs can be tested against a sufficient convergence condition, and if they satisfy the condition within an acceptable tolerance, they can be selected with confidence. Furthermore, the sufficient convergence condition can be solved directly to provide the TF transform and its inverse.

17 Claims, 4 Drawing Sheets

ITERATIVE TIME-FREQUENCY DOMAIN TRANSFORM METHOD FOR FILTERING TIME-VARYING, NONSTATIONARY WIDE BAND SIGNALS IN NOISE

BACKGROUND OF THE INVENTION

1. Field of the Invention

This invention relates to time-frequency (TF) domain transform filtering of time-varying, nonstationary wide band signals in noise and more specifically to an iterative TF domain transform method that improves the signal-to-noise ratio (SNR) and TF domain characteristics of the extracted signals.

2. Description of the Related Art

Stationary narrowband signals that are buried in wide band noise can be extracted using well known linear filtering techniques. The noisy signal is mapped into the Fourier domain, multiplied by a user defined bandpass filter mask, and mapped back into the time domain to produce a filtered signal. The filtered signal is guaranteed to have the desired frequency response characteristics because the Fourier transform is a one-to-one and onto mapping between the time and frequency domains. This technique efficiently rejects the wide band noise while preserving the narrowband signal. This linear filtering technique will, however, fail when the signal itself is wide band/nonstationary, such as chirps, speech, frequency hopped spread spectrum signals, and radar/sonar signals.

Instead, joint time-frequency (TF) domain transforms such as the Gabor, Wavelet, Wigner-Ville, and Choi-William transforms are used to extract wide band/nonstationary signals that are buried in noise. These TF domain transforms map one dimensional signals in the time domain into two dimensional signals in the joint time and frequency domains by exploiting the local behavior of nonstationary signals. The TF transforms spread the wide band noise uniformly over the entire TF plane while concentrating the signal information in a localized area of the plane. This significantly increases the signal-to-noise ratio (SNR) in the localized area. As a result, the signal information is much easier to detect in the TF domain than it is in the time domain alone.

The conventional linear filtering technique will not work in the TF domain because the TF transforms are redundant and not onto transformations. Thus, the TF response of the linear filtered signal may not have the desired time-frequency characteristics. The traditional approach to this problem is to use a least squares error (LSE) solution method, which finds the signal in the time domain that minimizes the squared error between the signal's TF response and the desired user specified localized time-frequency characteristics in the TF plane.

For example, a Discrete Gabor Transform (DGT) is defined by a pair of transform and inverse transform matrices $G_{MN \times L}$ and $H_{L \times MN}$, respectively, where M and N are the number of samples in the time and frequency domains and L is the length of the input signal vector s. The noisy wide band/nonstationary time domain signal, s is mapped into the time-frequency domain in accordance with:

$$C = G_{MN \times L} S \qquad (1)$$

where C is the DGT coefficient vector of length MN. As shown in FIG. 1a, the noise 10 is spread uniformly over the entire TF plane 12 whereas the signal information 14 in the noisy signal s is concentrated in a localized area of the TF plane. For purposes of simplicity, the localized area is shown as a diagonal. In general, the shape of the localized area depends on the characteristics of the signal information.

As shown in FIG. 1b, the coefficients C are masked to reject as much noise as possible while preserving the signal information. The masked DGT coefficients $C_{mask}$ are given by:

$$C_{mask} = D_{MN \times MN} G_{MN \times L} S \qquad (2)$$

where $D_{MN \times MN}$ is a time-frequency domain mask. The mask is computed only once for a given application because the signal information in the TF domain is relatively stationary. Specifically, $D_{MN \times mN}$ is a diagonal matrix, i.e. all of the off diagonal elements are zero, where the diagonal elements represent different locations in the TF plane and are assigned values of 0 or 1 based upon the magnitude of the DGT coefficients. Typically, the coefficients are thresholded such that values lying below the threshold are assigned a 0 and values lying above the threshold are assigned a 1 and define the mask 16. Ideally, the mask would preserve only the signal information and would reject all of the noise outside the signal band.

Thresholding algorithms that improve the definition of the mask 16 constitute a separate field of research. For purposes of signal extraction, a thresholding algorithm is assumed, and the goal is to extract the time domain signal whose DGT response most closely approximates the masked DGT response of the noisy signal s. As stated above, the known approach is to find the one solution x from the infinite possible solutions that minimizes the error between its DGT $G_{MN \times L} X$ and the desired frequency response $D_{MN \times MN} G_{MnIL} S$ in the least squares sense. The LSE solution is given by:

$$x:\min \|Gx - DGs\| \text{ over } L^2 \qquad (3)$$

where $L^2$ signifies a minimization in the least squares sense. As shown in FIG. 1c, DGT response 18, i.e. the DGT coefficients, of the extracted signal x includes time and frequency components outside of the mask 16, and thus is suboptimal.

The LSE approach does have important advantages. First, it is well known. Second, it is applicable to all of the known TF domain transforms, and particularly it is applicable to all pairs of analysis and synthesis window functions for the DGT. The DGT is particularly important because it is simple and has a fast computational algorithm. However, the LSE approach has two important drawbacks. First, it requires the inversion of very large matrices, which is computationally complex. Second, the TF domain response of the extracted signal only approximates the desired TF domain response given by the mask.

SUMMARY OF THE INVENTION

In view of the above problems, the present invention provides a computationally simple approach to filtering noisy wide band/nonstationary signals such that the TF response of the extracted signal more closely matches the desired time-frequency characteristics than does the known least squares solution and the SNR of the extracted signal is higher than that of the least squares solution.

This is accomplished by projecting the noisy signal into the TF domain, masking the TF response, computing the inverse TF transform to extract a filtered signal, and repeating these steps until the projection lies within the mask. As a result, the TF response of the extracted signal is substantially equal to the desired TF response, not merely a least squares approximation. Furthermore, the iterative approach avoids the necessity of inverting matrices, and thus is computationally simpler than the known least squares approach.

The TF transform and its inverse are selected so that the iterative algorithm is guaranteed to converge. Candidate transform pairs can be tested on known data, and if the TF response converges to the desired TF responses, the candidate pair is selected. Alternately, the candidate pairs can be tested against a sufficient convergence condition, and if they satisfy the condition within an acceptable tolerance, they can be selected with confidence. Furthermore, the sufficient convergence condition can be solved directly to provide the TF transform and its inverse.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a computationally simple method for filtering time-varying nonstationary wide band signals that improves the characteristics of the TF domain response of the extracted signal. The method projects the noisy signal into the TF domain, masks the TF response, computes the inverse TF transform to extract a filtered signal, and repeats until the projection lies within the mask. As a result, the TF domain response of the extracted signal is substantially equal to the desired TF domain response, not merely a least squares approximation. Furthermore, the iterative approach avoids the necessity of inverting matrices, and thus is computationally simpler than known approaches.

However, unlike the LSE approach, the iterative method is not guaranteed to converge for every pair of transform and inverse transform matrices $G_{MN \times L}$ and $H_{L \times MN}$, respectively. These matrices can be selected in one of two ways. First, candidate pairs can be tested on known data, and if their TF domain responses converge to the desired TF response, the candidate pair can be selected. This approach has the drawback of having to extensively test each transform pair before it can be reliably used in a communications system. Second, candidate pairs can be tested against a sufficient convergence condition, and if they satisfy the condition within an acceptable tolerance, they can be selected with confidence. Such a condition has been found for the DGT. Although sufficient convergence conditions have not been found for the other TF transforms, they may be found in the future.

Figure 1A:
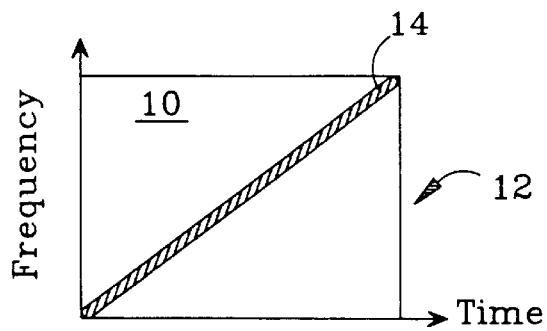
FIGS. 1a, 1b and 1c, described above, illustrate the TF response of a noisy signal, the masked response, and the TF response of the least squares solution.
Figure 1B:
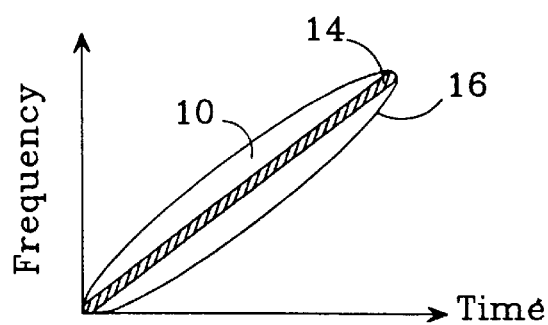
Figure 1C:
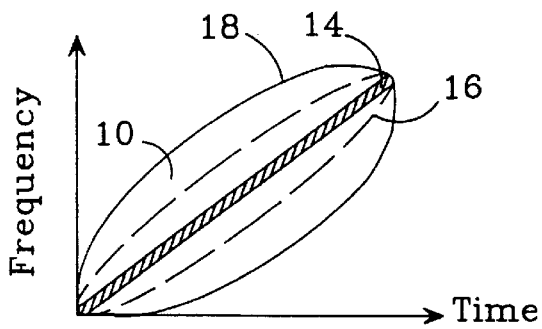
Figure 2:
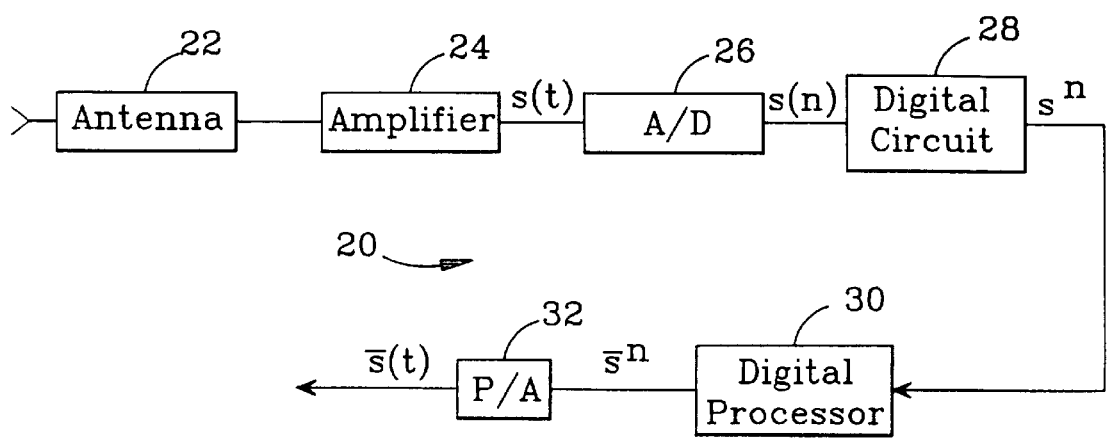
FIG. 2 is a block diagram of a communications receiver that implements the iterative time-frequency algorithm of the present invention.

FIG. 2 is a block diagram of a communications receiver 20 that receives a time-varying nonstationary wide band signal s(t) such as a chirp, speech, frequency hopped spread spectrum signals, or radar/sonar, and filters it to extract a limit signal $\bar{s}$(t) with an improved SNR. The signal s(t) is received and amplified by an antenna 22 and an amplifier 24, respectively. An A/D converter 26 digitizes the signal s(t) into a sequence of samples s[n]. A digital circuit 28 blocks the samples s[n] into a sequence of vectors $s^0$, $s^1$, ... A digital processor 30 iterates the projection algorithm of the present invention on each successive vector $s^n$ until it converges to a limit vector $\bar{s}^n$ that is output to a D/A converter 32 that converts the sequence of limit vectors into an analog filtered time signal $\bar{s}$(t).

Figure 3:
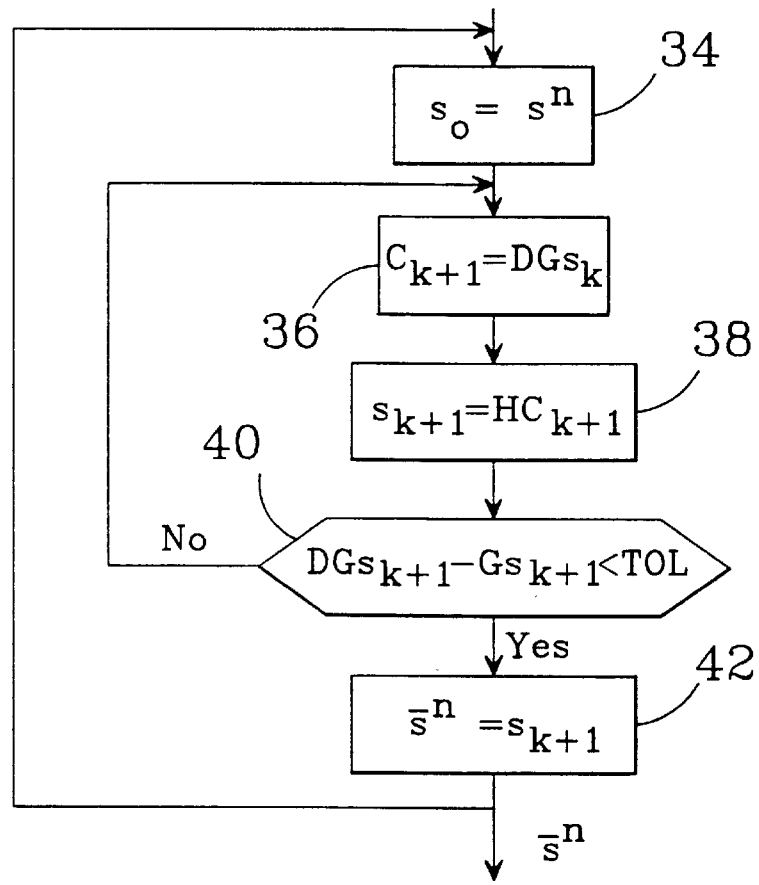
FIG. 3 is a flowchart of the iterative time-frequency algorithm for extracting a noisy wide band/nonstationary signal.

FIG. 3 is a flowchart of the iterative projection algorithm executed by the digital processor 30 in FIG. 2. In step 34, the processor initializes a vector $s_0 = s^n$ of length L. In step 36, the processor computes the TF transform and then masks the TF response of the signal $s_k$ in accordance with:

$$C_{k+1} = D_{MN \times MN} G_{MN \times L} s_k \qquad (4)$$

where $G_{MN \times L}$ is the transform, matrix, $D_{MN \times MN}$ is the mask, and $C_k$ is the TF transform coefficients of the masked TF response. In step 38, the processor computes the inverse transform of the masked TF response to produce a filtered signal $s_{k+1}$. The inverse transform is computed as follows:

$$s_{k+1} = H_{L \times MN} C_{k+1} \qquad (5)$$

where $H_{L \times MN}$ is the inverse transform matrix. In step 40, the processor checks for convergence. If the TF response of the iterated signal is close enough to the masked response then the algorithm is deemed to have converged. If allowed to iterate enough times, the TF response of the limit signal $\bar{s}^n$ will actually fall within the mask such that:

$$D_{MN \times MN} G_{MN \times L} \bar{s}^n = G_{MN \times L} \bar{s} \qquad (6)$$

The processor repeats steps 36 and 38 until the TF response of the signal $s_{k+1}$ has converged. Once convergence is achieved, the limit signal $\bar{S}^{-n}$ is set equal to $s_{k+1}$ (step 42) and output to the D/A 32 shown in FIG. 2. The processor reads in the next vector $s^{n+1}$ and executes the iterative algorithm.

Figure 4:
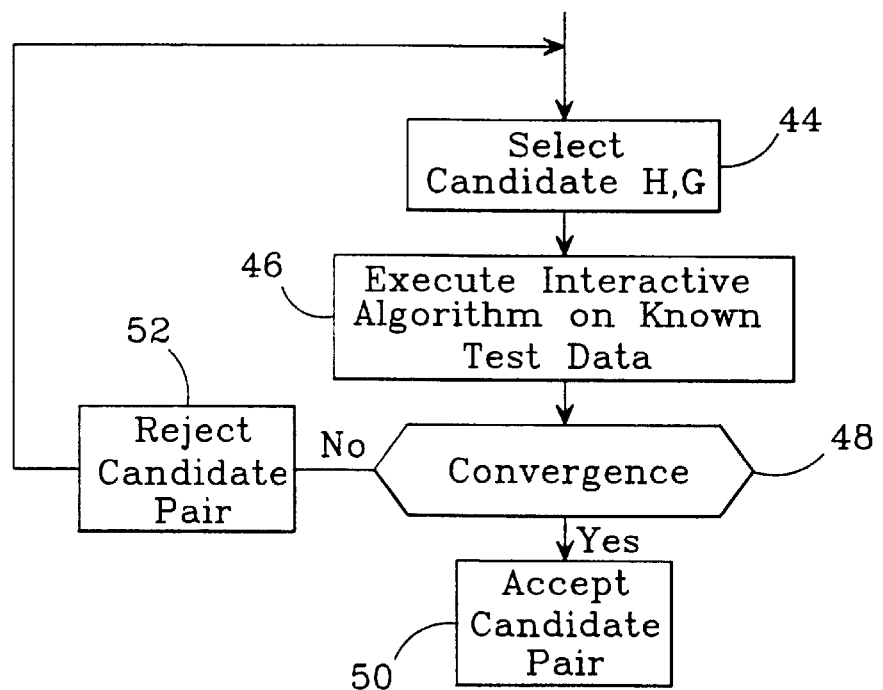
FIG. 4 is a flowchart for selecting a pair of transform and inverse transform matrices via testing on known data.

The pair of transform and inverse transform matrices $G_{MN \times L}$ and $H_{L \times MN}$ must be selected to ensure that the TF response does in fact converge in FIG. 3. This can be done through testing on known data or using a sufficient convergence condition. As shown in FIG. 4, a pair of candidate transform matrices $G_{MN \times L}$ and $H_{L \times MN}$ for a particular class of TF domain transforms is selected (step 44). Techniques for selecting inverse transform pairs for the various classes are well known. Thereafter, the iterative algorithm described in FIG. 3 is executed on known test data using the candidate transforms (step 46). If the TF response converges to the desired response (step 48) then the candidate pair is accepted (step 50). Otherwise the candidate pair is rejected (step 52), and another pair of candidate transforms is selected.

Figure 5A:
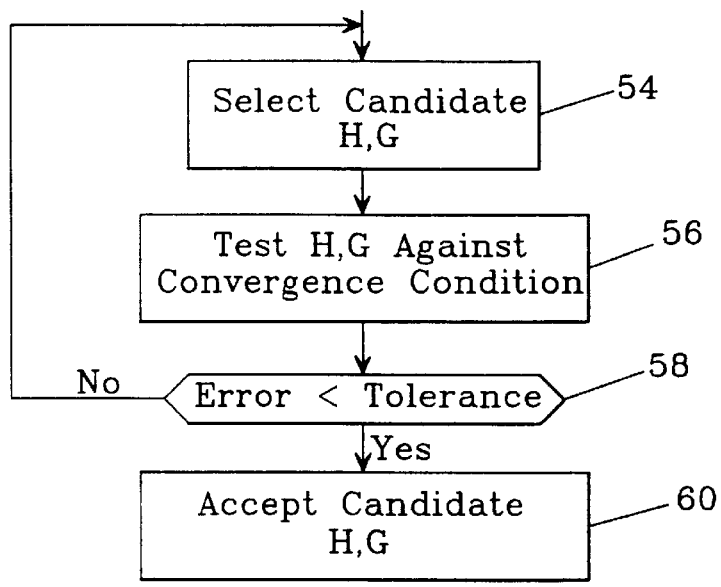
FIGS. 5a and 5b are flow charts for selecting a pair of transform and inverse transform matrices that satisfy a convergence condition.
Figure 5B:
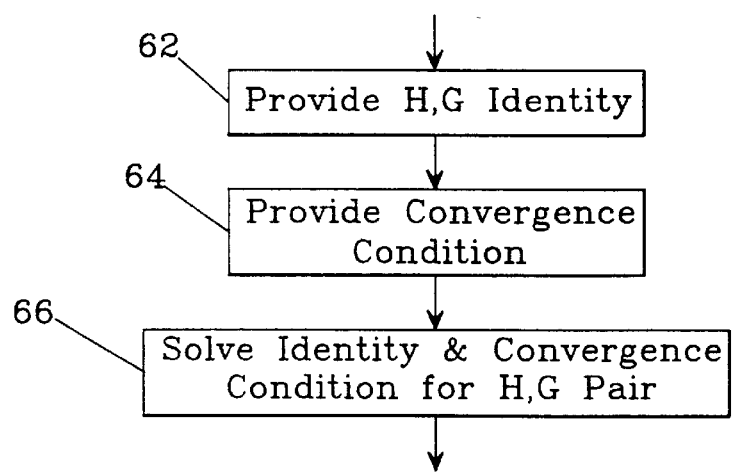

The preferred method for selecting a pair of transforms is to use a sufficient convergence condition, which if satisfied guarantees convergence. As shown in FIG. 5a, a pair of candidate transform matrices $G_{MN \times L}$ and $H_{L \times MN}$ for a particular class of TF domain transforms is selected (step 54). Thereafter, the transform pair is tested against the convergence condition (step 56). If the candidate pair satisfy the condition within a given tolerance (step 58) they are accepted (step 60). Otherwise, the pair is rejected and another pair of candidate transforms is selected. As shown in FIG. 5b, an alternate approach is to provide the identity that described the transform pair (step 62), provide the convergence condition (step 64), and directly solve the two equations for a transform pair that is guaranteed to converge (step 66). The equations can be solved using well known numerical techniques. However, these techniques are computationally complex.

The sufficient convergence condition has only been found for one class of TF domain transforms; the DGT, and particularly the subclass of DGTs described by J. Wexler and S. Raz "Discrete Gabor Expansions", Signal Processing, Vol 21, 1990, pp. 207–220, where the lengths of signals and window functions are the same.

For the DGT, the TF transform given in equation 1 is rewritten as:

$$C_{m,n} = \sum_{k=0}^{L-1} s[k] \gamma^*_{m,n}[k] \qquad (7)$$

where s[k] are samples of a noisy signal having period L, $\gamma_{m,n}[K]$ is the conjugate of an analysis window function:

$$\gamma_{m,n}[k] = \gamma[k - m\Delta M] W_L^{n\Delta N k} \qquad (8)$$

where $W_L = \exp(j2\pi/L)$, $j = \sqrt{-1}$, $\Delta M$ and $\Delta N$ are the time and frequency sampling interval lengths, and M and N are the numbers of sampling points in the time and frequency domains respectively, such that $Mx(\Delta M) = Nx(\Delta N) = L$. The $(mN+n)^{th}$ row and $k^{th}$ column elements of the DGT matrix $G_{MN \times L}$ are the conjugate of the analysis window function given in equation 8 for $0 \leq m \leq M-1$, $0 \leq n \leq N-1$, and $0 \leq k \leq L-1$.

The dual to equation 1 is s=HC, which for the DGT is rewritten as:

$$s[k] = \sum_{m=0}^{M-1} \sum_{n=0}^{N-1} C_{m,n} h_{m,n}[k] \qquad (9)$$

where $h_{m,n}[k]$ is a synthesis window function:

$$h_{m,n}[k] = h[k - m\Delta M] W_L^{n\Delta N k} \qquad (10)$$

The $k^{th}$ row and $(mN+n)^{th}$ column elements of the inverse DGT $H_{L \times MN}$ are given by the synthesis window function in equation 10 for $0 \leq m \leq m-1$, $0 \leq n \leq N-1$, and $0 \leq k \leq L-1$.

The synthesis and analysis window functions h[k] and γ[k] must satisfy the following identity:

$$\sum_{k=0}^{L-1} h[k + mN] W_L^{nMk} \gamma^*[k] = \delta[m]\delta[n], \qquad (11)$$

$$0 \leq m \leq \Delta N - 1, 0 \leq n \leq \Delta M - 1.$$

In the critical sampling case when $M(\Delta M) = N(\Delta N) = L$, given h[k], the solution for γ[k] is unique. However, in noise reduction applications the DGT is oversampled (MN≧L) to provide redundancy in time-frequency domain, which spreads the noise uniformly over the entire plane. In the oversampling case, there are infinitely many solutions for γ[k] given h[k]. In the following, we use the minimum norm solution for γ[k] given h[k] described by Wexler and Raz.

In addition to the condition on the synthesis and analysis window functions imposed by the identity in equation 11, we have found that the following condition on the window functions is sufficient to guarantee that the time domain solutions converge to a solution with the desired time frequency characteristics in the TF plane:

$$\sum_{l=0}^{\Delta N-1} \gamma^*[lN + k] h[lN + k + m\Delta M] = \qquad (12)$$

$$\sum_{l=0}^{\Delta N-1} h^*[lN + k] \gamma[lN + k + m\Delta M]$$

for k=0,1, ... N−1 and m=0, 1, ..., M−1. Because the DGT and its inverse are uniquely determined by the selection of the synthesis and analysis window functions h[k] and γ[k], a convergence condition on the window functions is equivalent to a convergence condition on the DGT pair. It is important to note that both the identity in equation 11 and the convergence condition in equation 12 are both signal independent. Thus, once a pair of window functions is found that satisfies both criteria, the pair can be used in any application.

Satisfying the convergence condition guarantees that the DGT of the limit signal falls inside the mask such that the convergence relation given in equation 6 is satisfied. Furthermore, under the convergence condition, the first step of the iterative algorithm is equal to the least squares solution and each additional iteration increases the SNR of the extracted signal.

As described in FIG. 5a above, the DGT and inverse DGT matrices are selected and tested against the convergence condition. If the difference between the two sides of the condition is less than a given tolerance, the DGT pair is accepted. In this case, the DGT and its inverse are found by satisfying the identity in equation 11 using the well known least squares or minimum norm approaches.

As described in FIG. 5b above, the identity and convergence condition can be solved simultaneously to provide the h[k] and γ[k] window functions, and hence, the DGT and inverse DGT matrices that satisfy the condition. This approach has the advantage of not having to test the candidate transform pairs against the condition. However, although the numerical techniques used to solve equations 11 and 12 simultaneously are well known, they are also computationally complex.

Figure 6A:
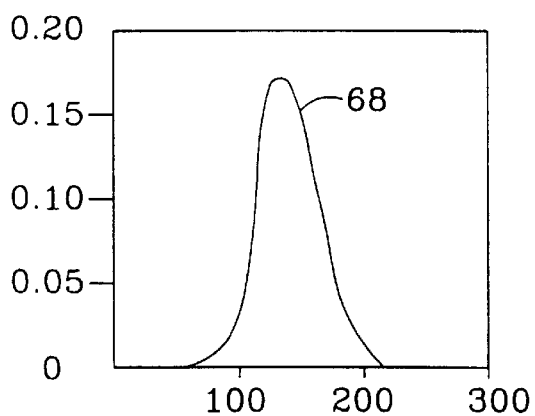
FIGS. 6a and 6b are plots of a pair of synthesis and analysis window functions, respectively, that satisfy the convergence condition.
Figure 6B:
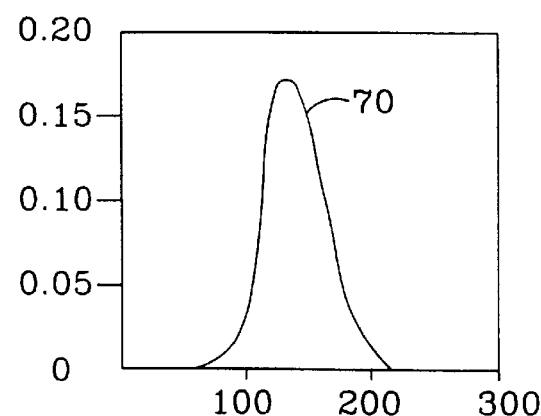

The iterative time-filtering algorithm has been tested on a synthetic signal with two different pairs of window functions. The synthetical signal includes a chirp signal x[n] given by:

$$x[n] = \cos(2\pi[(n+1)/100]^3), 0 \leq n \leq 500 \qquad (13)$$

that is buried in white Gaussian noise. The window function length is 256, and the time and frequency sampling interval lengths $\Delta M$ and $\Delta N$ are 16 and 2, respectively. The first pair of synthesis and analysis window functions 68 and 70 shown in FIGS. 6a and 6b, respectively, satisfy both the identity of equation 11 and the convergence condition of equation 12. The window functions are empirically the same, e.g. the maximum difference between them is $2 \times 10^{-6}$ compared to a peak amplitude of approximately 0.18. We have not been able to prove that the two window functions are mathematically the same. This is not meant to imply that this is the only solution that satisfies both the identity and the convergence condition. The second pair of window functions satisfy the identity but do not satisfy the convergence condition.

Figure 7:
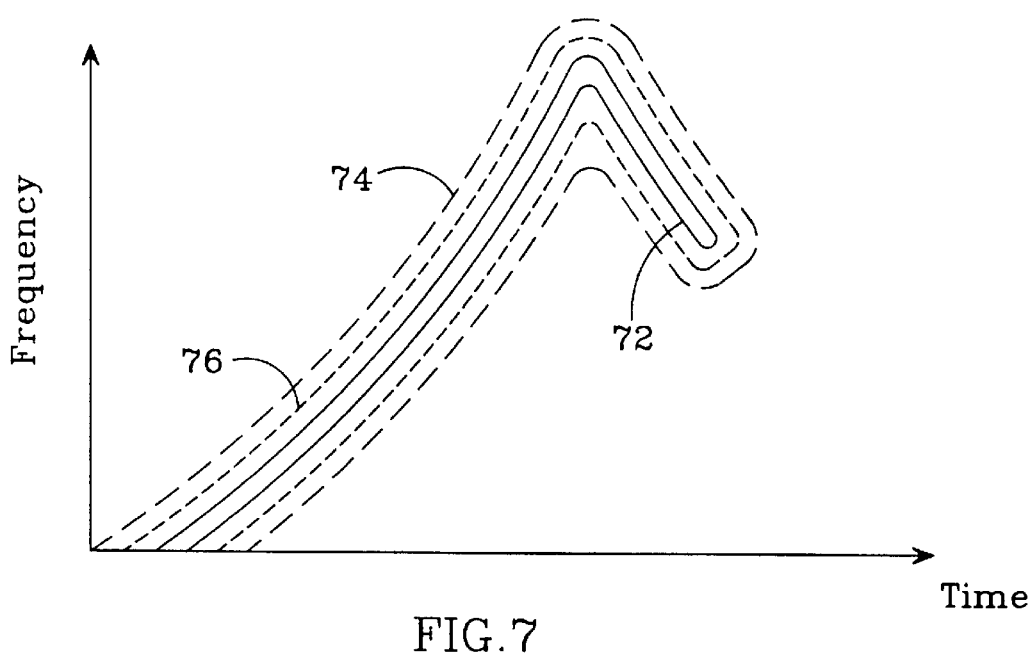
FIG. 7 illustrates the TF response for the iterative algorithm.

FIG. 7 is a plot of the projection of the DGT response onto the TF plane for the first pair of window functions. The desired mask 72 is shown as a solid line. After the first iteration, the DGT response 74 (shown as a dotted line) is the least squares solution. Clearly, this solution has time and frequency components outside of the desired mask 72. After the third iteration, the DGT response 76, shown as a dashed line, has moved towards the desired mask. After the eighth iteration, the DGT response has converged, and thus lies within the desired mask 72. As a result, the limit signal produced by the iterative algorithm has better time-frequency characteristics than does the filtered signal produced by the known least squares approach.

For the second pair of window functions, the DGT response converges to a solution but the DGT response of the limit signal does not equal the desired response. As a result, the performance of the second pair of window functions is clearly worse than the performance of the first pair, and is actually worse than the least squares solution for the first pair.

Figure 8:
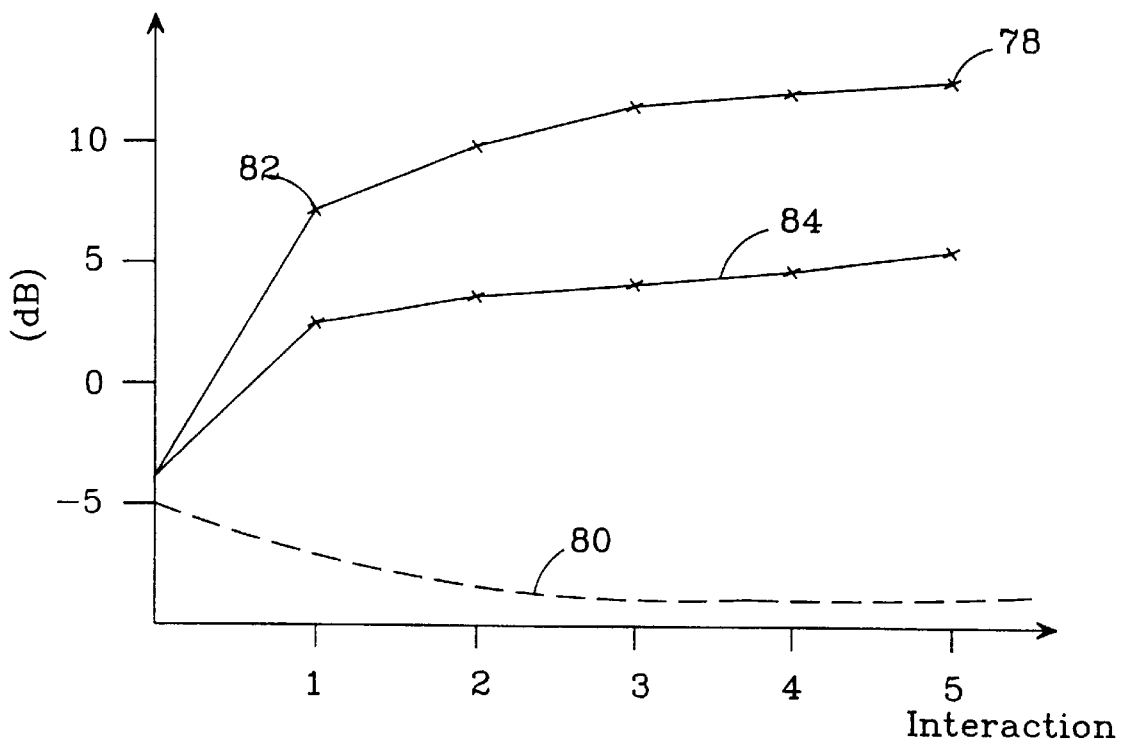
FIG. 8 is a plot of the SNR of the extracted signal versus iteration.

FIG. 8 is a plot of the SNR 78 and the error 80 between the DGT response of the solution and the desired characteristics versus iteration for the first pair of window functions. For this example, the iterative time-frequency algorithm provides 3.5 dB SNR improvement over the least squares solution 82. The iterative algorithm may provide more or less gain depending upon the characteristic of the particular noisy signal, but is guaranteed to provide better SNR than the least squares approach if the convergence condition is satisfied. When the convergence condition is not satisfied, the performance of the iterative algorithm may be inferior as illustrated by the plot of the SNR 84 for the second pair of window functions.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method for filtering time-varying nonstationary wideband signals, comprising:
    a) protecting a noisy time-varying nonstationary wideband signal s onto a time-frequency (TF) plane so that the noise is spread over the TF plane and the signal information is concentrated in a local area of the TF plane;
    b) masking the TF plane to reject the noise that lies outside the local area;
    c) generating an estimated signal $s_{k+1}$ from the signal information and the noise in the local area;
    d) repeating steps a, b, and c until the estimated signal $S_{k+1}$ converges to a limit signal $\bar{s}$; and
    e) extracting the limit signal $\bar{s}$ as an estimate of the signal information in the noisy signal s,
    said method further comprising:
    f) selecting a class of TF domain transforms for filtering the signals; and
    g) selecting a pair of transform and inverse transform matrices from the selected class, said signal s being multiplied by the transform matrix to project the signal onto the TF plane, and the masked signal information and noise in the local area being multiplied by the inverse transform matrix to generate the estimated signal $s_{k+1}$,
    wherein the pair of transform and inverse transform matrices are selected by:
    h) selecting a candidate pair of transform and inverse transform matrices;
    i) iterating steps a,b and c on a test signal t having a known information content and noise until an estimated test signal $t_{k+1}$ converges to a test limit signal $\bar{t}$;
    j) when the signal $\bar{t}$ approximates the known information content, selecting the candidate pair of transform and inverse transform matrices for application to the noisy time-varying nonstationary wideband signals s, and otherwise repeating steps h and i.

2. A method for filtering time-varying nonstationary wideband signals, comprising:
    a) projecting a noisy time-varying nonstationary wideband signal s onto a time-frequency (TF) plane so that the noise is spread over the TF plane and the signal information is concentrated in a local area of the TF plane;
    b) masking the TF plane to reject the noise that lies outside the local area;
    c) generating an estimated signal $S_{k+1}$ from the signal information and the noise in the local area;
    d) repeating steps a, b, and c until the estimated signal $S_{k+1}$ converges to a limit signal $\bar{s}$; and
    e) extracting the limit signal $\bar{s}$ as an estimate of the signal information in the noisy signal s,
    said method further comprising:
    f) selecting a class of TF domain transforms for filtering the signals; and
    g) selecting a pair of transform and inverse transform matrices from the selected class, said signal s being multiplied by the transform matrix to project the signal onto the TF plane, and the masked signal information and noise in the local area being multiplied by the inverse transform matrix to generate the estimated signal $S_{k+1}$,
    wherein the pair of transform and inverse transform matrices are selected by:
    h) providing a condition on said transform and inverse transform matrices that when satisfied guarantees the convergence of the estimated signal $s_{k+1}$ to the limit signal $\bar{s}$;
    i) selecting a candidate pair of transform and inverse transform matrices;
    j) testing the candidate pair of transform and inverse transform matrices to determine whether they satisfy the condition; and
    k) when the condition is satisfied, selecting the candidate pair of transform and inverse transform matrices for application to the noisy time-varying nonstationary wideband signals s, and otherwise repeating steps i and j.

3. The method of claim 2, wherein the class of TF domain transforms is the Discrete Gabor Transform (DGT), in which the selection of the transform and inverse transform matrices uniquely selects a pair of analysis and synthesis window functions $\gamma[n]$ and $h[n]$, said condition being given by:

$$\sum_{l=0}^{\Delta N-1} \gamma^*[lN+k]h[lN+k+m\Delta M] =$$

$$\sum_{l=0}^{\Delta N-1} h^*[lN+k]\gamma[lN+k+m\Delta M],$$

for k=0, 1, . . . , N−1 and m=0,1, . . . , M−1 where M and N are the number of sampling points in the time and frequency domains, respectively, and ΔM and ΔN are the time and frequency sampling lengths, respectively, said candidate pair of transform and inverse transform matrices satisfying the condition when the equality is within a given tolerance.

4. A method for filtering time-varying nonstationary wideband signals, comprising:
  receiving a noisy time-varying nonstationary wideband signal s[n] that includes signal information and noise;
  windowing the noisy signal s[n] to generate a signal vector s of length L;
  selecting a class of time-frequency (TF) domain transforms;
  computing a pair of transform $G_{MN \times L}$ and inverse transform $H_{L \times MN}$ matrices for the selected class of TF domain transforms, where M and N are the number of sampling points in the time and frequency domains, respectively;
  generating a mask $D_{MN \times MN}$ for the signal vector s;
  initializing an estimate signal $s_0 = s$;
  iteratively computing;
    a) $C_{k+1} = D_{MN \times MN} G_{MN \times L} S_k$, and
    b) $S_{k+1} = H_{L \times MN} C_{k+1}$ where $C_{k+1}$ is a vector of transform coefficients, until $S_{k+1}$ converges to a limit signal $\bar{s}$; and
  extracting the limit signal $\bar{S}$ as an estimate of the signal information in signal vector s.

5. The method of claim 4, wherein the pair of transform and inverse transform matrices G and H, respectively, are selected by:
  c) selecting a candidate pair of transform and inverse transform matrices;
  d) iterating steps a and b on a test signal t having a known information content and noise until an estimated test signal $t_{k+1}$ converges to a test limit signal $\bar{t}$;
  e) when the signal $\bar{t}$ approximates the known information content, selecting the candidate pair of transform and inverse transform matrices for application to the noisy time-varying nonstationary wideband signals s, and otherwise repeating steps c and d.

6. The method of claim 4, wherein the pair of transform and inverse transform matrices $G_{MN \times L}$ and $H_{L \times MN}$, respectively, are selected by:
  c) providing a condition on said transform and inverse transform matrices that when satisfied guarantees the convergence of the estimated signal $s_{k+1}$ to the limit signal $\bar{s}$;
  d) selecting a candidate pair of transform and inverse transform matrices;
  e) testing the candidate pair of transform and inverse transform matrices to determine whether they satisfy the condition; and
  f) when the condition is satisfied, selecting the candidate pair of transform and inverse transform matrices for application to the noisy time-varying nonstationary wideband signals s, and otherwise repeating steps d and e.

7. The method of claim 6, wherein the class of TF domain transforms is the Discrete Gabor Transform (DGT), in which the selection of the transform and inverse transform matrices uniquely selects a pair of analysis and synthesis window functions γ[n] and h[n], said condition being given by:

$$\sum_{l=0}^{\Delta N-1} \gamma^*[lN+k]h[lN+k+m\Delta M] =$$

$$\sum_{l=0}^{\Delta N-1} h^*[lN+k]\gamma[lN+k+m\Delta M],$$

for k=0,1, . . . , N−1 and m=0,1, . . . , M−1 where M and N are the number of sampling points in the time and frequency domains, respectively, and ΔM and ΔN are the time and frequency sampling lengths, respectively, said candidate pair of transform and inverse transform matrices satisfying the condition when the equality is within a given tolerance.

8. The method of claim 4, wherein the mask $D_{MN \times MN}$ is generated by:
  multiplying the noisy signal s by the transform matrix $G_{MN \times L}$ to produce an amplitude response in a TF plane;
  thresholding the amplitude response to produce a binary mask in the TF plane; and
  mapping the mask onto a diagonal matrix.

9. The method of claim 4, wherein the estimated signal $S_{k+1}$ converges to the limit signal $\bar{s}$ so that the transform of the limit signal $\bar{s}$ lies within the noise truncation mask.

10. The method of claim 4, wherein the estimated signal $s_1$ produced by the first iteration of steps a and b is substantially equal to a least squares error (LSE) solution for extracting the signal information in signal vector s.

11. A method for filtering time-varying nonstationary wideband signals, comprising:
  receiving a noisy time-varying nonstationary wideband signal s[n] that includes signal information and noise;
  windowing the noisy signal s[n] to generate a signal vector s of length L;
  selecting a Discrete Gabor Transform (DGT) class of time-frequency (TF) domain transforms;
  providing a convergence condition that is given by:

$$\sum_{l=0}^{\Delta N-1} \gamma^*[lN+k]h[lN+k+m\Delta M] =$$

$$\sum_{l=0}^{\Delta N-1} h^*[lN+k]\gamma[lN+k+m\Delta M],$$

for k=0,1, . . . , N−1 and m=0,1, . . . , M−1 where M and N are the number of sampling points in the time and frequency domains, respectively, ΔM and ΔN are the time and frequency sampling lengths, respectively, where the signal is oversampled such that MN>L;
  selecting a pair of discrete time-varying synthesis h[n] and analysis γ[n] window functions for the DGT that satisfy the condition within a given tolerance;
  computing a pair of transform $G_{MN \times L}$ and inverse transform $H_{L \times MN}$ matrices from the synthesis h[n] and analysis γ[n] window functions;
  generating a mask $D_{MN \times MN}$ for the signal vector s;
  initializing an estimate signal $s_0 = s$;
  iteratively computing;
    a) $C_{k+1} = D_{MN \times MN} G_{MN \times L} S_k$, and
    b) $S_{k+1} = H_{L \times MN} C_{k+1}$ where $C_{k+1}$ is a vector of Gabor transform coefficients, until $S_{k+1}$ converges to a limit signal $\bar{s}$; and extracting the limit signal $\bar{s}$ as an estimate of the signal information in signal vector s.

12. The method of claim 11, wherein the mask $D_{MN \times MN}$ is generated by:

multiplying the noisy signal s by the transform matrix $G_{MN \times L}$ to produce an amplitude response in a TF plane;

thresholding the amplitude response to produce a binary mask in the TF plane; and mapping the mask onto a diagonal matrix.

13. The method of claim 11, wherein the estimated signal $S_{k+1}$ converges to the limit signal $\bar{s}$ so that the DGT of the limit signal $\bar{s}$ lies within the mask.

14. The method of claim 11, wherein the estimated signal $s_1$ produced by the first iteration of steps a and b is substantially equal to a least squares error (LSE) solution for extracting the signal information in signal vector s.

15. The method of claim 11, wherein the selected synthesis h[n] and analysis γ[n] window functions are approximately the same window function.

16. The method of claim 11, wherein the synthesis h[n] and analysis γ[n] window functions are selected by:

selecting a pair of candidate synthesis h[n] and analysis γ[n] window functions; and testing the candidate synthesis h[n] and analysis γ[n] window functions against the convergence condition until a pair is found that satisfies the condition within the given tolerance.

17. The method of claim 11, wherein the synthesis h[n] and analysis γ[n] window functions must also satisfy the following identity:

$$\sum_{k=0}^{L-1} h[k+mN]W_L^{-nMk}\gamma^*[k] = \delta[m]\delta[n],$$

$$0 \leq m \leq \Delta N - 1, 0 \leq n \leq \Delta M - 1,$$

where $W_L = \exp(j2\pi/L)$ and j is the complex operator $\sqrt{-1}$ and δ[m] and δ[n] are impulse functions, said synthesis h[n] and analysis γ[n] window functions being selected by directly solving the convergence condition and the identity for h[n] and γ[n].

* * * * *